US007184032B2

(12) United States Patent
Stohrer et al.

(10) Patent No.: US 7,184,032 B2
(45) Date of Patent: Feb. 27, 2007

(54) TACTILE OVERLAYS FOR SCREENS

(75) Inventors: Charles W. Stohrer, Rochester, NY (US); Murray O. Meetze, Jr., Rochester, NY (US); Dennis C. DeYoung, Webster, NY (US)

(73) Assignee: Xerox Corporation, Stamford, CT (US)

( * ) Notice: Subject to any disclaimer, the term of this patent is extended or adjusted under 35 U.S.C. 154(b) by 87 days.

(21) Appl. No.: 10/939,895

(22) Filed: Sep. 13, 2004

(65) Prior Publication Data

US 2005/0030296 A1 Feb. 10, 2005

Related U.S. Application Data

(62) Division of application No. 10/113,105, filed on Mar. 29, 2002, now Pat. No. 6,864,878.

(51) Int. Cl.
*G06K 15/00* (2006.01)

(52) U.S. Cl. ........................ 345/173; 345/23; 345/156; 345/214; 178/18.11; 341/23; 348/564; 463/31

(58) Field of Classification Search .................. 345/23, 345/156, 168, 172, 173, 214; 178/18.11; 341/22, 23; 348/564; 463/31
See application file for complete search history.

(56) References Cited

U.S. PATENT DOCUMENTS 98,803 A * 1/1870 Gourgey et al. ............. 76/78.1
184,574 A * 11/1876 Phillips et al. ........ 280/137.501
4,799,083 A * 1/1989 Knodt ......................... 40/518
5,059,960 A * 10/1991 Rosenberg et al. ......... 345/174
5,821,512 A * 10/1998 O'Hagan et al. ........... 235/383
5,909,211 A * 6/1999 Combs et al. .............. 345/172
6,059,575 A * 5/2000 Murphy ...................... 434/112
6,259,044 B1 * 7/2001 Paratore et al. ............. 200/5 A
6,278,441 B1 * 8/2001 Gouzman et al. ........... 345/163
6,356,210 B1 * 3/2002 Ellis ........................... 340/990
6,357,940 B1 * 3/2002 Murphy ...................... 400/483
6,459,364 B2 * 10/2002 Gupta ..................... 340/407.1
6,469,712 B1 * 10/2002 Hilpert et al. .............. 715/727
6,636,203 B1 * 10/2003 Wong et al. ................ 345/173
6,704,133 B2 * 3/2004 Gates et al. ................ 359/296
2002/0036617 A1 * 3/2002 Pryor ......................... 345/156
2002/0140714 A1 * 10/2002 Hoffman ..................... 345/700
2002/0177877 A1 * 11/2002 Choy ............................ 607/1

OTHER PUBLICATIONS

Braille touch scren overlay of thin transparent film with tactile information on LCD button being pressed Derwent Acc No. 2001-519583; Pub No. 441011; Pub. Date Jan. 10, 2001.*

* cited by examiner

*Primary Examiner*—Bipin Shalwala
*Assistant Examiner*—Vincent E. Kovalick
(74) *Attorney, Agent, or Firm*—Joseph M. Young

(57) ABSTRACT

An overlay for use with a display screen, comprising at least one first tactilely readable area, wherein the display screen includes a first feature thereon, wherein the tactilely readable area includes information in a tactilely readable format, and wherein the information identifies a first feature displayed on the screen.

16 Claims, 10 Drawing Sheets

FIG. 5
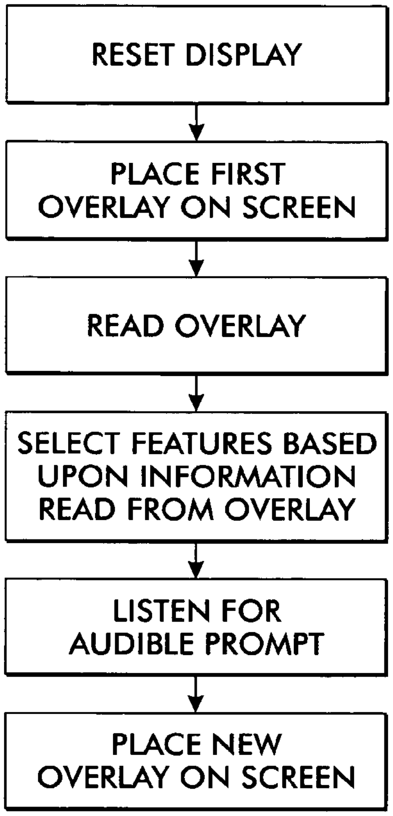
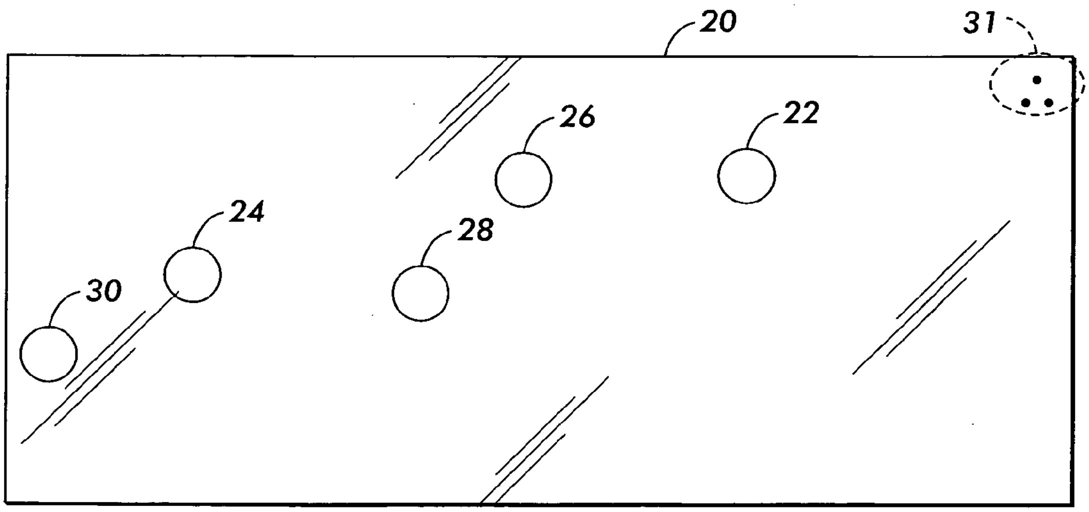
FIG. 6

TACTILE OVERLAYS FOR SCREENS

CROSS REFERENCE TO RELATED APPLICATIONS

This is a divisional of U.S. application Ser. No. 10/113,105, filed Mar. 29, 2002 now U.S. Pat. No. 6,864,878 by the same inventors, and claims priority therefrom.

BACKGROUND AND SUMMARY

The embodiments disclosed herein relate generally to a method and apparatus for assisting the blind with graphical user interfaces (GUIs), especially touch screen devices, and more specifically to the use of transparent overlays having tactilely readable features such as, for example, Braille characters thereon.

As electronic devices are becoming increasingly prevalent in the world, the use of devices having GUIs is becoming increasingly necessary for the normal performance of a number of major life activities. Four example, working, learning, and generally enhancing the quality of life. Yet, although these devices are easily accessible to most people, they are partially or entirely inaccessible to certain individuals with disabilities, whose normal performance of major life activities is thereby substantially limited.

In the office, workers use computers, fax machines, printing devices, such as copiers and printers, and other electronic equipment. Often, the equipment will include a screen having a GUI thereon. Further, some devices will include touch screens, where the device not only communicates to the user through visual means, but the user communicates to the device by touching the screen.

Currently, blind or visually impaired operators cannot read the information displayed by a GUI, nor can they use a touch screen on a printing device, since there are typically no non-visual means for communicating information to them to guide them to the appropriate selection areas. A blind operator must enlist the help of a sighted user in completing the most simple of programming tasks.

In considering the applications of Section 508 of the Americans with Disabilities Act (29 U.S.C. §794d), business equipment will have to be designed to allow for easier access by a wider body of users, with a variety of physical limitations.

U.S. Pat. No. 6,059,575 to Murphy discloses a tactile recognition input device, which includes a plurality of activation keys movable in a direction generally parallel to the input device to activate the input device and transmit input signals. Each of the keys includes a tactilely recognizable region including, for example, a Braille character. A tactile recognition overlay is used with an existing input device, such as a membrane computer keyboard.

U.S. Pat. No. 6,278,441 to Gouzman et al. disclose an electronic data display system which includes a system for containing a multiple data field environment (MDFE) including portions of displayable data; at least first and second displays for displaying data contained within the MDFE, capable of displaying data selected from different portions of the MDFE, wherein at least one of the displays is a tactile display; apparatus for selecting data for display by the first display, from a first portion of the MDFE; and apparatus for selecting data for display by the second display, from a second portion of the MDFE, different from the first portion. Gouzman et al. also disclose that preferably, two or more of the at least first and second displays are tactile displays.

All references cited in this specification, and their references, are hereby incorporated by reference in their entirety where appropriate for relevant teachings of additional or alternative details, features, and/or technical background.

The embodiments disclosed herein include a series of flexible overlays that mount over the surface of a touch screen, and have areas that communicate information tactilely to users, along with a form or audible feedback to direct the user to the required areas. The face of the overlay contains at least one tactilely readable area that describes the function selection that resides immediately beneath it (over the field that the sighted person would see and use). In embodiments, Braille instructions specifically are used to communicate information to the user.

In embodiments, the flexible overlay is substantially transparent, so that an operator with full visual acuity can see through the overlay without interference. A fully sighted user can thus assist the visually impaired operator in efficiently learning to use this system.

In embodiments, the flexible overlay is substantially opaque. An image of the corresponding screen display is included thereon so that a fully sighted user can thus assist the visually impaired operator.

In embodiments, a single overlay comprises a plurality of tactilely readable areas, wherein a first area corresponds to a first selectable feature of a first display and a second area corresponds to a second selectable feature of a second display, thereby enabling the overlay to be used with both displays.

BRIEF DESCRIPTION OF THE DRAWINGS

The embodiments will be described in detail herein with reference to the following figures in which like reference numerals denote like elements and wherein:

FIG. 5 illustrates a flow chart corresponding to the method of using the overlay of FIG. 3.

FIG. 6 illustrates a schematic view of an overlay for use with the exemplary displays shown in FIGS. 7–10.

DETAILED DESCRIPTION OF EMBODIMENTS

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

In the description below, various details have been omitted, such as the operation of touch screen displays, in order not to obscure the description of embodiments disclosed herein. "Screen" refers for example to the hardware having a graphical "display" thereon.

Figure 1:
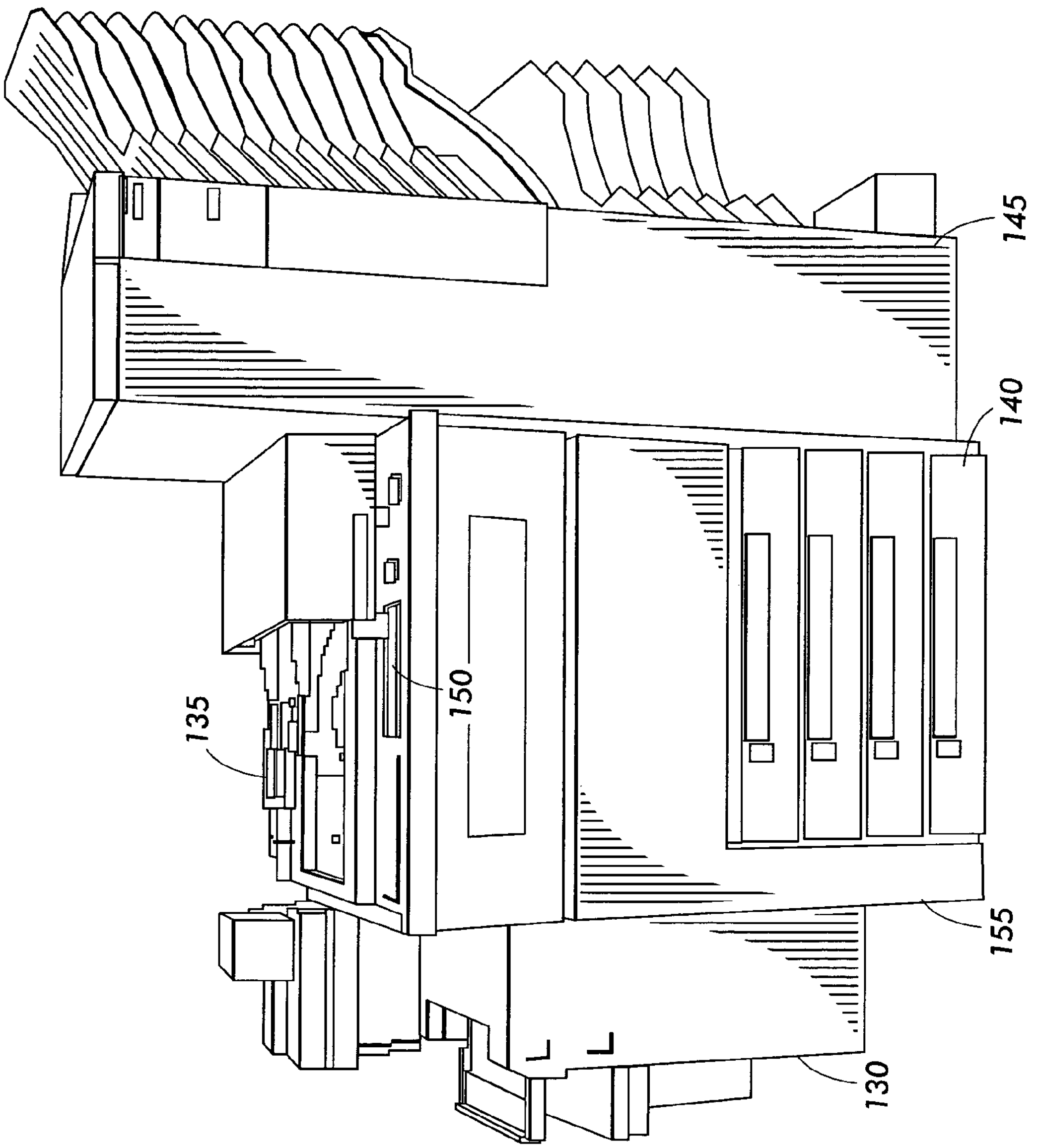
FIG. 1 illustrates a graphic representation of a printing device.

FIG. 1 illustrates an overall construction of an embodiment of a multi-function printing device having a touch screen control display. The printing device, as illustrated in FIG. 1, includes, for example, a scanning station 135, a printing station 155, and a finisher device 145, which can be a sorter, tower mailbox, stapler, etc. The printing station 155 can include a plurality of paper trays 140 that store the paper used in the printing process. Lastly, the printing device can include a high capacity feeder 130, which is capable of holding large amounts of paper stock to be used by the machine.

In addition, the printing device will often include a GUI 150. The GUI 150 allows the user to control the various functions of the printing device by presenting various types of displays to the user which provides the user an opportunity to program certain job or function characteristics. In many devices, the GUI 150 is touch sensitive. It is generally difficult for visually impaired persons to use a touch sensitive screen without assistance.

Figure 2:
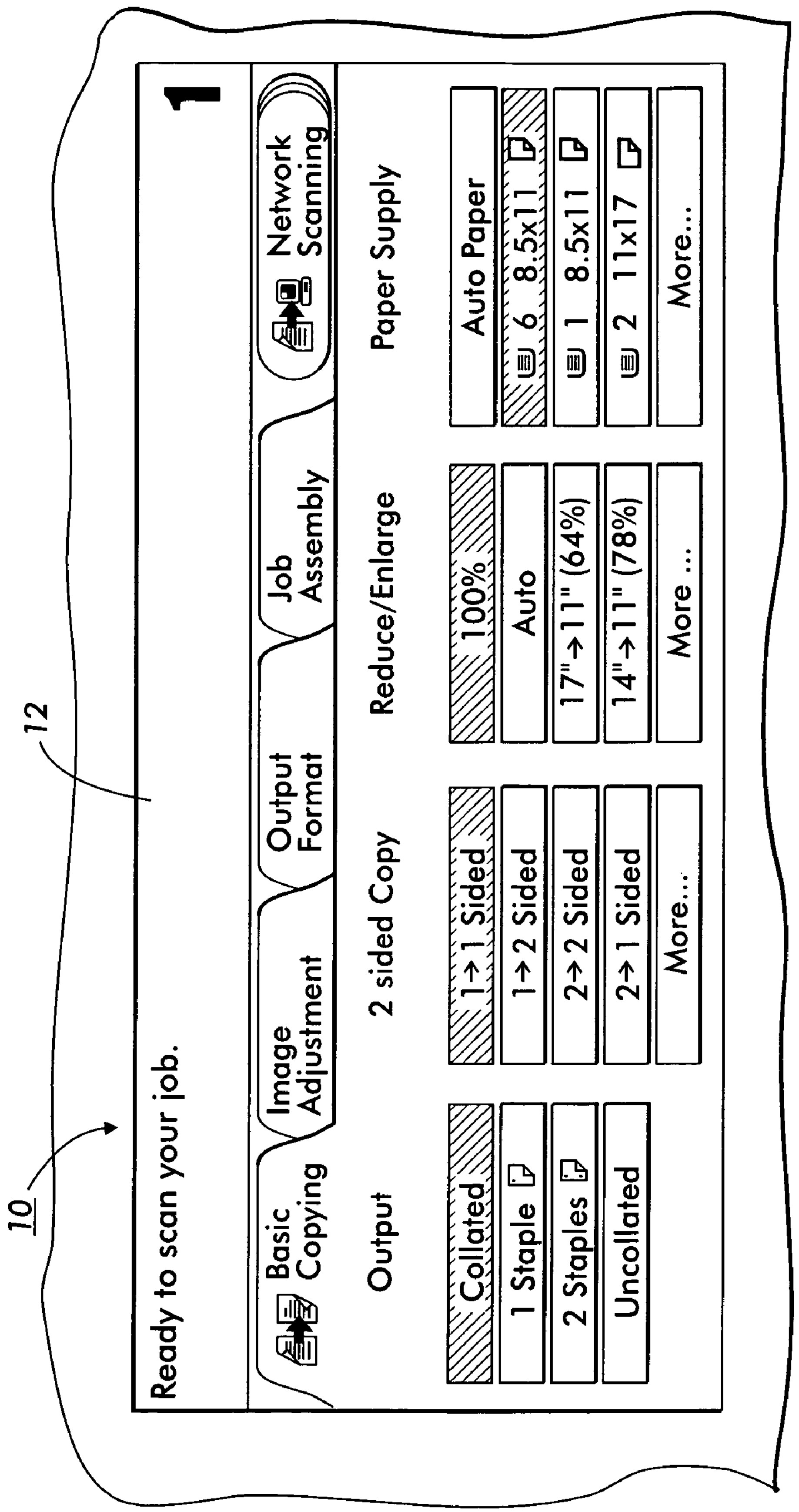
FIG. 2 illustrates an exemplary embodiment of a display of a first GUI as it would appear on a screen.

FIG. 2 illustrates an example of a touch sensitive screen 10 with a GUI display exhibited thereon. The display image 12 is taken specifically from a Document Centre 265ST machine. This display 12 is meant to be exemplary and the embodiments described herein, while mainly relating to scanning and printing functions, are intended to be used in any situation where a user contends with GUIs, and especially touch sensitive screens. The display 12 on the screen 10 includes access to multiple features including selectable features.

"Feature" can refer to any visual object that makes up a portion of a video display. A "selectable feature" is one that causes something to happen when selected by the user. Selectable features can take the forms of, for example, tabs, buttons, bars, etc.

The display 12 illustrated in FIG. 2 includes a variety of selectable features such as four tabs, nineteen rectangular bars, and one button that a user can tap to alter the output of a print or copy job. A non-visually-impaired person simply taps the screen where a desired feature is located to change one or more settings for a print, copy, or scan job. A visually impaired person would find it difficult, if not impossible, to operate a printing device, copying device, or scanning device with a touch screen interface such as that disclosed in FIG. 2.

Figure 3:
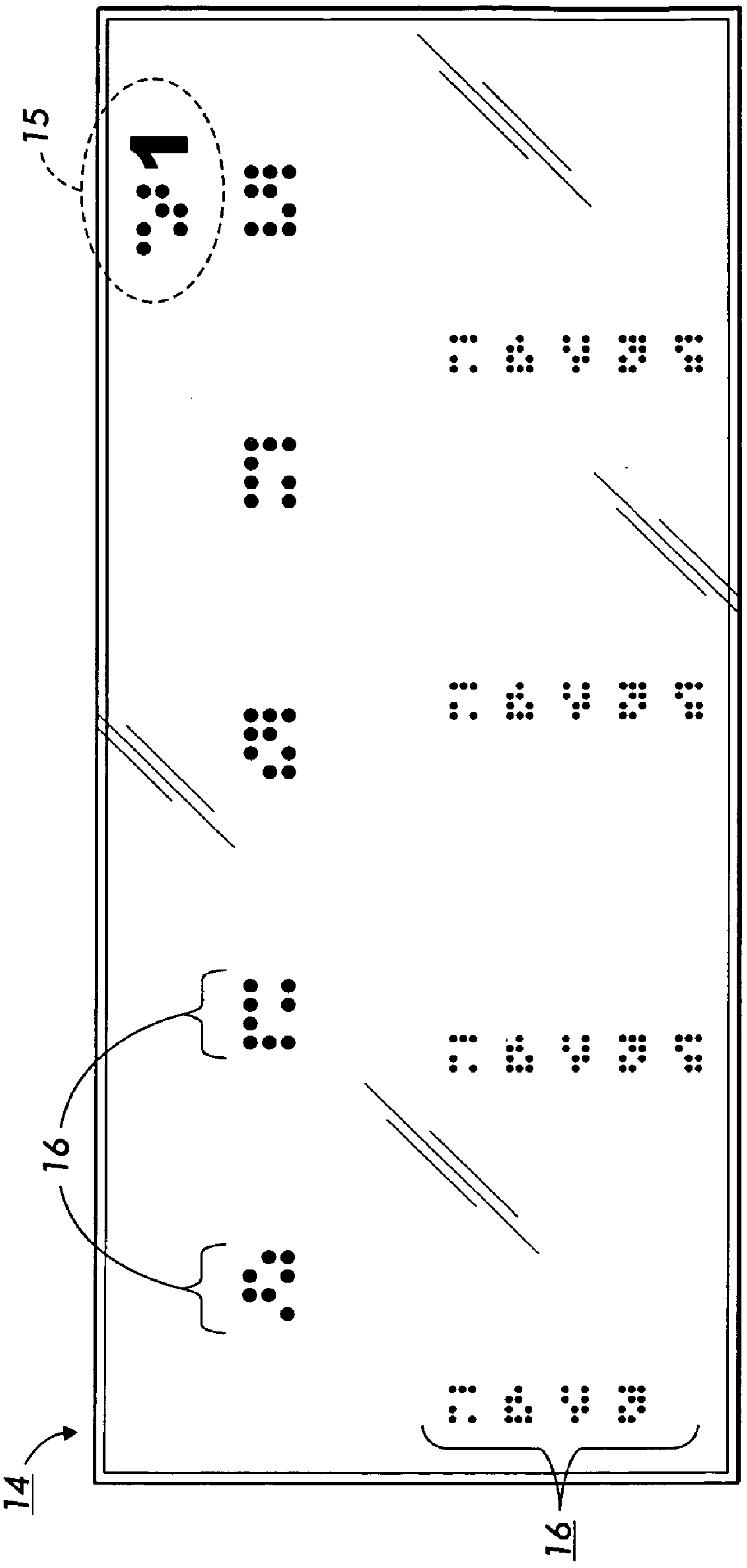
FIG. 3 illustrates a first exemplary embodiment of an overlay corresponding to the touch screen interface of FIG. 2.
Figure 4:
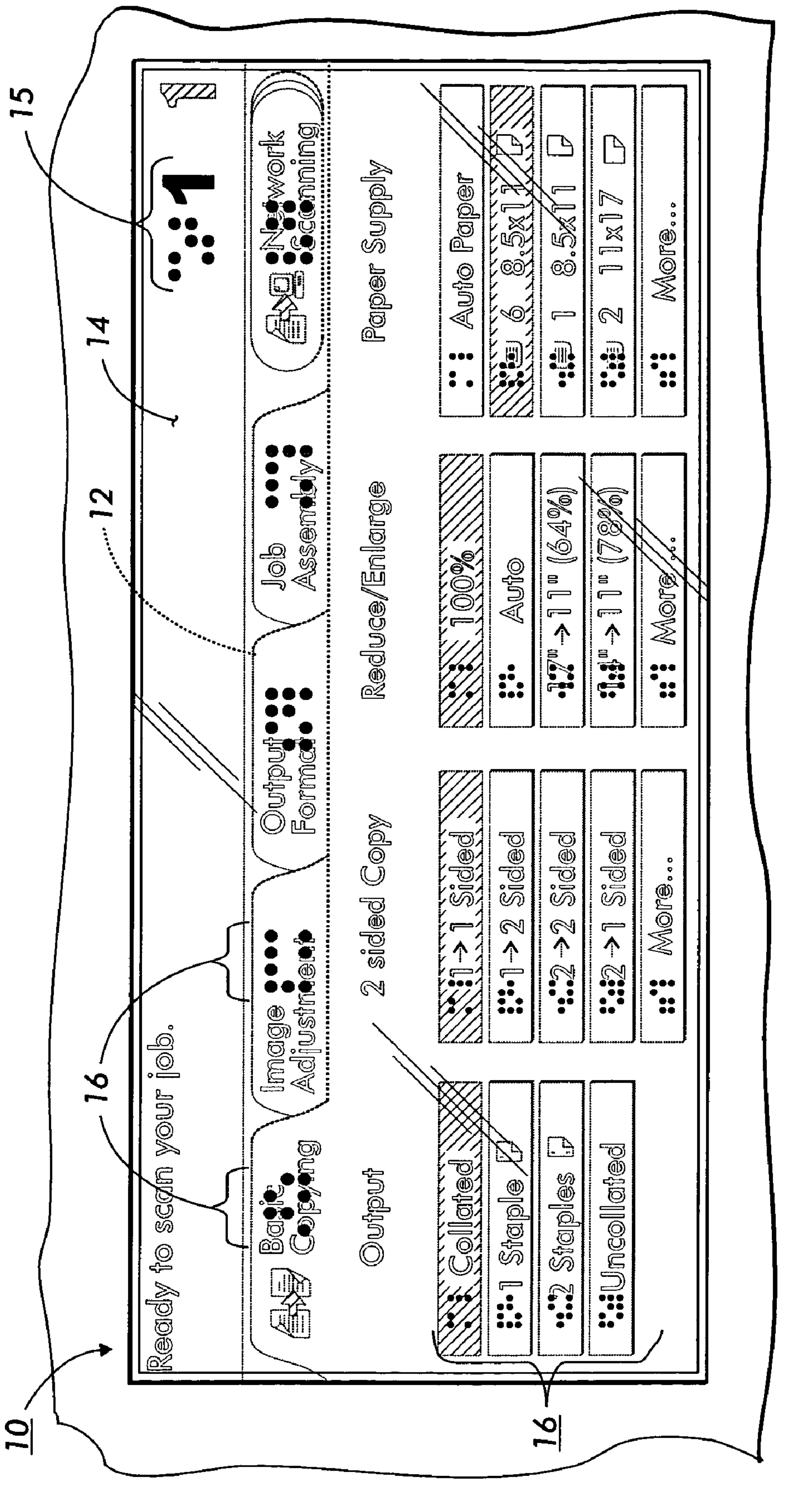
FIG. 4 illustrates the overlay of FIG. 3 superimposed over the touch screen interface of FIG. 2.

FIG. 3 illustrates an embodiment of an overlay 14 for the display 12 shown in FIG. 2. In embodiments, such as the embodiment shown in FIG. 3, the overlay is substantially transparent. In embodiments, the overlay 14 includes tactilely readable areas 16 located at positions corresponding to the positions of the selectable features in FIG. 2. In embodiments, these tactilely readable areas 16 take the form of raised protrusions. The raised protrusions 16 will typically identify the feature on the display 12 that resides immediately beneath the protrusions. The protrusions 16 may also convey additional information to the user. For example, the protrusions can describe the function of a feature. FIG. 4 illustrates the overlay 14 in place over the touch sensitive screen 10.

In embodiments, such as that shown in FIG. 3, the raised protrusions take the form of Braille characters. However, the raised protrusions do not have to be Braille characters. The only requirement is that the user has to understand the information conveyed by the raised protrusions. The raised protrusions could be, for example, an alternative alphabet or a set of specific symbols associated with a device that the user could be trained to recognize.

In embodiments, the overlay 14 can include a tactilely readable identifying mark or label 15 as shown in FIGS. 3 and 4. The label would inform the user that the overlay 14 corresponds to the display 12 shown in FIG. 2. Each overlay for a device would have a label indicating the display to which it corresponds.

In embodiments, the overlays can be used in the manner outlined in the flow chart of FIG. 5. The operator first approaches a device having a touch screen interface. In embodiments, the machine can be equipped with a hard reset button (not shown) that resets the display to an initial or start up configuration. The reset button can have a tactilely readable identification on or near it to identify it as such. If the user is unsure whether the device is set to the start up display, he can simply depress the reset button to return the screen to the start up display. The operator then selects the first overlay corresponding to, for example, an initial or start-up display on the screen. The first overlay will typically be chosen from a set that is positioned either on or near the device. The overlays can be numerically coded near a corner for easy identification. The operator then places the first overlay on the touch screen, where it can be held in place by one of a variety of methods, such as a simple press fit. The user reads the overlay and determines the location of the feature or features that he wishes to press. The user then selects the feature or features on the display (typically by pressing the feature through the overlay). Selecting a feature often causes a new display to appear on screen or, alternatively, modifies the existing display so that some features are removed or others are added, thereby requiring the user to switch the overlay for a new one. The device typically provides a signal when the display changes and the user is required to change overlays. The operator then proceeds to remove the first overlay and places a second overlay on the screen corresponding to the particular signal received from the device. The overlays can continue to be changed as required until a task is completed.

In embodiments, the signal will comprise audible feedback. Audible feedback can be provided either through a series of beeps, i.e. 2 beeps indicates proceed to next overlay, or a voice command can instruct the operator which overlay to use next. The overlays would either be kept stacked in order or the user would read the label to find which overlay to use next. In embodiments, the labels could simply read one, two, three, etc. The user would select the overlay labeled "two" when he heard the prompt. Alternatively, each particular overlay can be related to a particular corresponding audible prompt. For example, if the overlays are individually numbered, a particular pattern of beeps could correspond to a particular overlay. For example, the user would select overlay four when the audible prompt consisted of four beeps.

In embodiments, a single overlay can be used with multiple displays. In situations where multiple displays have at least some features located in the same position, the tactilely readable areas of the overlay can be interpreted based upon what display is currently on screen. For example, the raised area portion could be associated with a feature determining paper size function if placed on one display, and duplexing if placed on another display. Audio signals could inform the user which display was on the screen. The raised area portion would communicate both possible meanings to the user, and the audio signal produced when a new display appeared on the screen would let the user know the context in which the overlay was being used.

In other embodiments, each of the tactilely readable areas of an overlay corresponds to distinct features. Single overlay embodiments are especially, but not solely, useful where a user will only be using a few displays or where the task being accomplished only requires a few user actions to enter the necessary information. The overlay also would not necessarily have to have all the features from every display. For example, many scanning and printing devices have esoteric features that a majority of users do not use. Those features can be left off the overlay. A simple overlay that includes the most commonly required features of several displays could suffice for most of the people most of the time.

FIG. 6 shows a schematic drawing of an example of such an overlay 20. The overlay 20 of FIG. 6 is set up for the particular task of scanning a set of printed pages, and having the scanned images deposited in a network repository that the user could access from a computer. FIGS. 7–10 show the displays (32, 36, 42, 46) with which the overlay 20 is used. The five tactilely readable areas (22, 24, 26, 28, 30) on the overlay 20 correspond to features on the displays in FIGS. 7–10. FIGS. 7–10 represent several GUIs from a Document Centre 265ST machine. The embodiments shown in FIGS. 7–10 are meant to be exemplary and should not be considered limiting in any manner. Area 22 corresponds to the Network Scanning feature 34 of display 32 shown in FIG. 7. Area 24 corresponds to the default feature 38 in FIG. 8. Area 26 corresponds to the image adjustment tab 40 in FIG. 8. Area 28 corresponds to the feature labeled “Sides Scanned” 44 of FIG. 9. Area 30 corresponds to the “2 Sided” feature 48 of FIG. 10. More tactilely readable areas can be created on the overlay 20 to further increase its usefulness.

In embodiments, the overlay 20 can be used for multiple purposes as is. For example, someone using a document handler having a default display on its screen such as the display 32 shown in FIG. 7 first places the overlay 20 over the display 32. If, for example, the user wants to scan a simplex document to a file, the user loads the document into a document feeder. The user then runs her fingers across the surface and reads the information on the overlay 20. The user determines the location of the area 22 over Network Scanning 34 and presses it causing the display 32 to change to the display 36 shown in FIG. 8. The user then finds and presses the area 24 corresponding to the default feature 38 in FIG. 8. Then the user presses the start button (not shown). This scans a simplex document to file. To scan a duplex document to file the user presses the areas (22, 24) in the same order. However, the user then proceeds to press the area 26 corresponding to the image adjustment tab 40 of FIG. 8. This causes the display 42 shown in FIG. 9 to be shown on the screen of the device. The user then presses the area 28 corresponding to the sides scanned button 44. This causes the display 46 shown in FIG. 10 to be shown on the screen of the device. The user then presses the area 30 corresponding to the 2 Sided feature 48 in FIG. 10. Finally, the user presses the start button. This causes the machine to scan a duplex document to file.

In embodiments, audio prompts can still be used to notify the user when the display on the screen changes. The prompts would simply alert the user as to what was being displayed on the screen.

Figure 7:
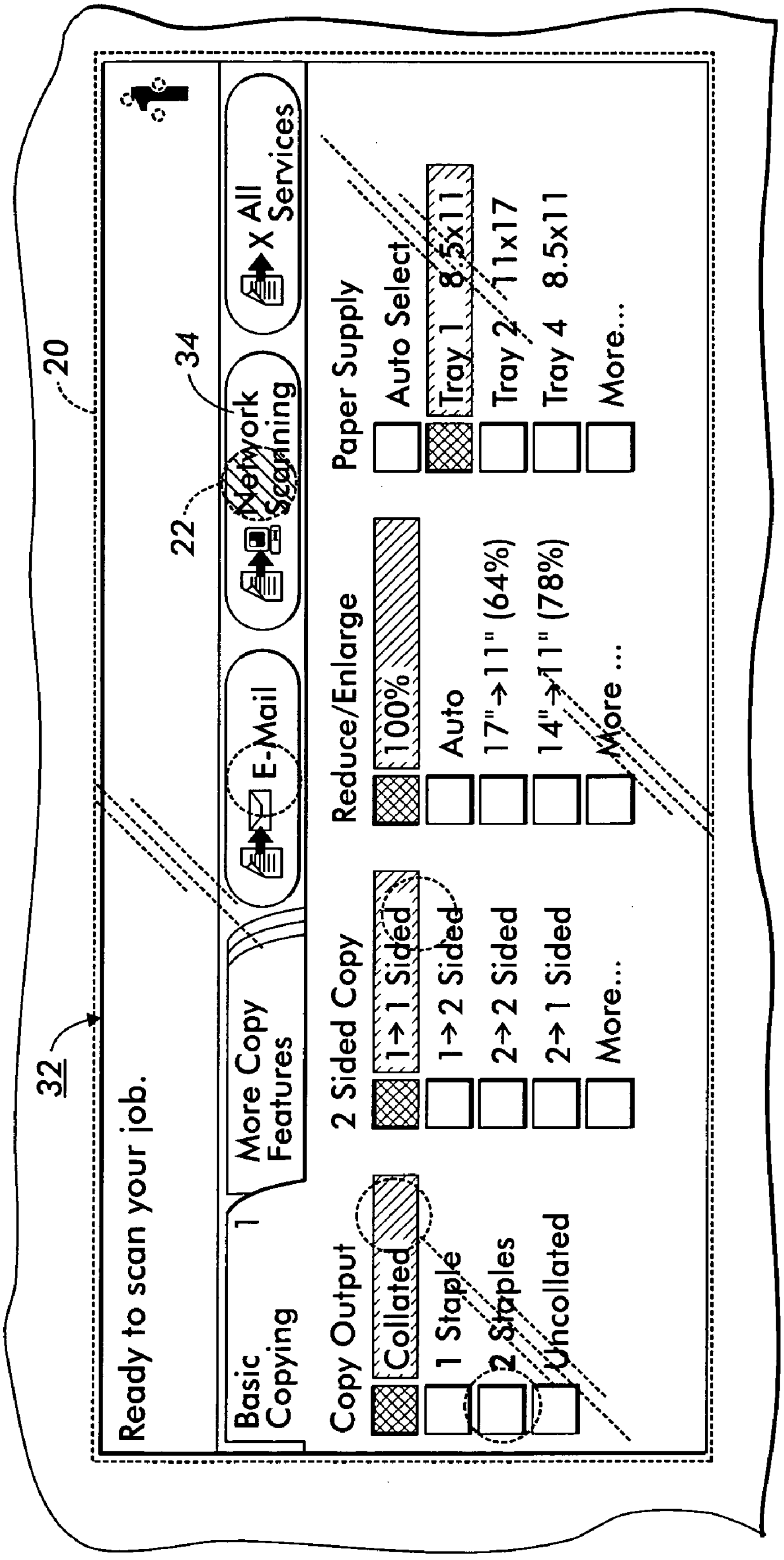
FIG. 7 illustrates an exemplary embodiment of a first display of a second GUI with the overlay of FIG. 6 placed on top of it.
Figure 8:
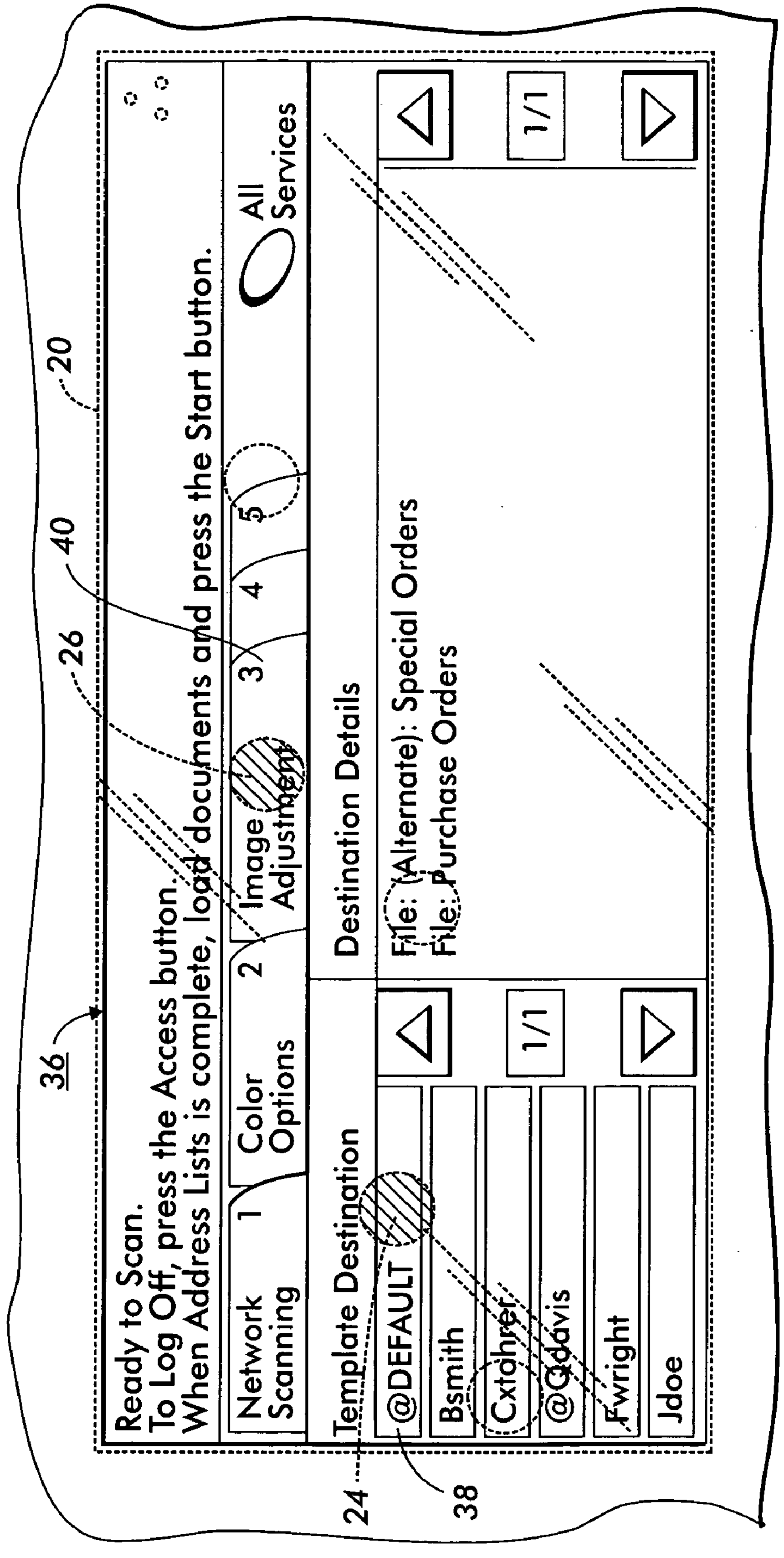
FIG. 8 illustrates an exemplary embodiment of a second display of a second GUI with the overlay of FIG. 6 placed on top of it.
Figure 9:
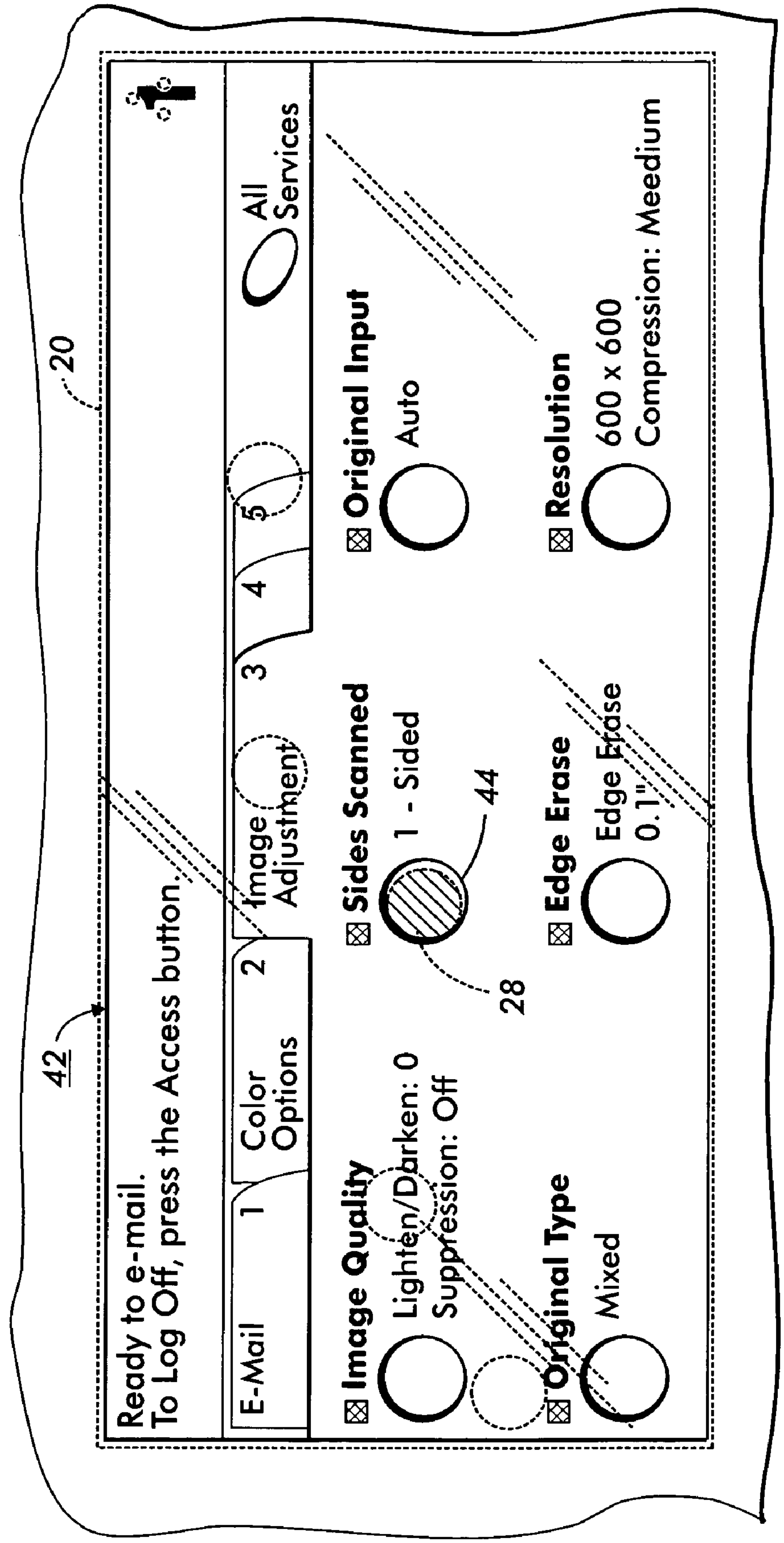
FIG. 9 illustrates an exemplary embodiment of a third display of a second GUI with the overlay of FIG. 6 placed on top of it.
Figure 10:
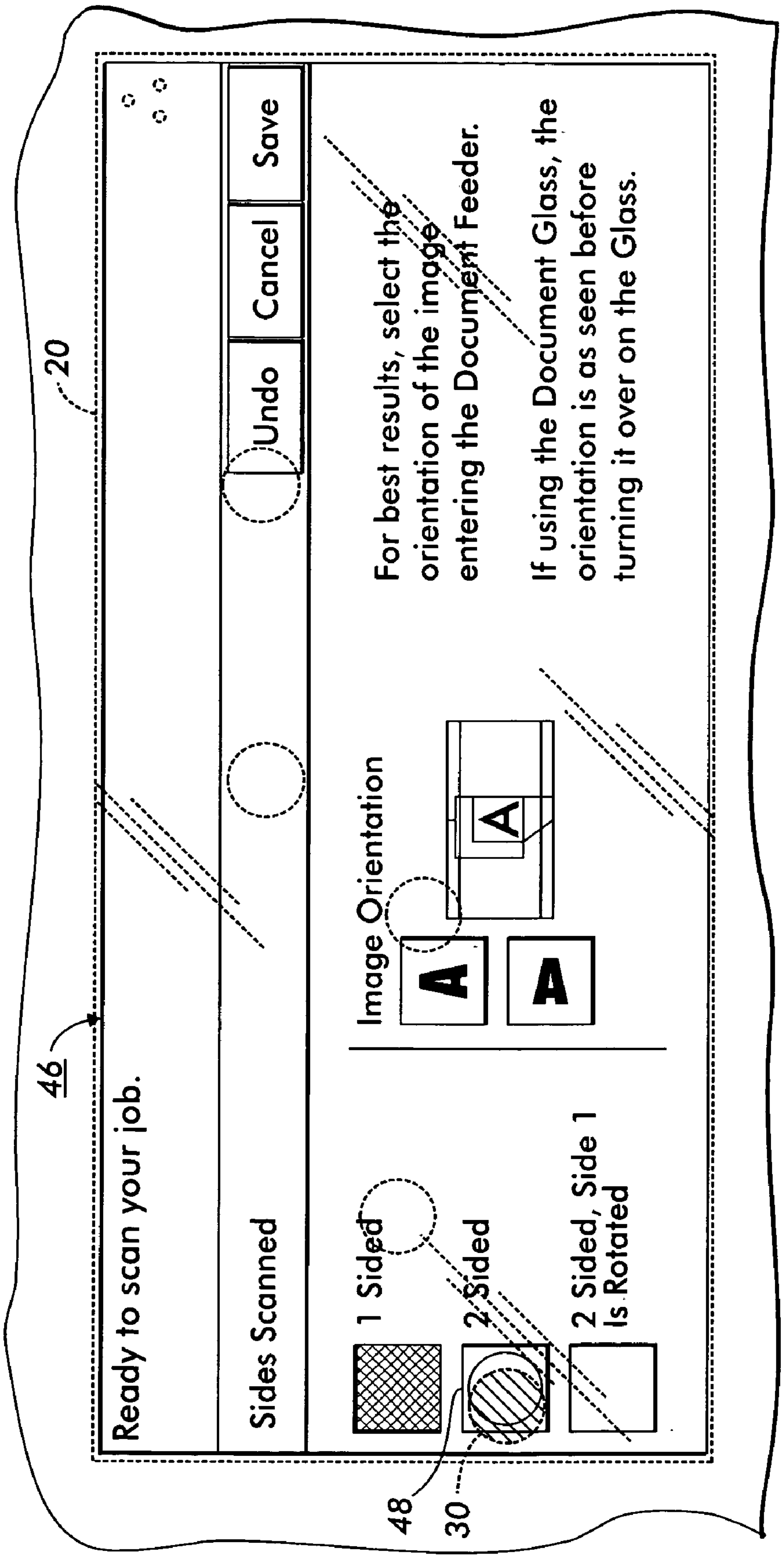
FIG. 10 illustrates an exemplary embodiment of a fourth display of a second GUI with the overlay of FIG. 6 placed on top of it.

In embodiments, the tactile information conveyed by the areas may inform the user of the feature to which it corresponds. For example, in the embodiment shown in FIG. 7, area 22 may tell the user that the feature beneath it is “Network Scanning”. For this case, the user would typically be instructed in advance on what areas or tabs need to be pressed to print a document to file. However, in other embodiments, the area 22 may indicate other useful information. For example, area 22 may simply convey to the user the number “1” to indicate that it is the first area in a sequence to be pressed. For this case, the user could also be instructed in advance on what areas or tabs need to be pressed to print a document to file. For example, the user could be instructed to press buttons 1–5 in that order to scan a duplex document to file.

In embodiments, an overlay could be designed for a particular function or functions. In embodiments, overlay 20 can include a touch readable identifying mark or label 31 as shown in FIG. 6. The label would include information telling the user what function(s) can be accomplished with that particular overlay. The mark 31 could, for example, identify the overlay 20 as for use when scanning simplex or duplex documents to file. For overlays used a single task, the areas on it would simply need to indicate the order in which to press them. A user would simply press area 1, then area 2, etc., in order to complete a particular task, with no need for specific instruction. The user would read find the overlay for a task and press the buttons in order. Audible feedback could still be used to signal that the display on the screen has changed, where the displays do not change instantaneously. Alternatively, for overlays that can be used for more than one specific task (such as the one illustrated in FIG. 6), the mark 31 could convey that the overlay was for a group of tasks such as, for example, scanning simplex and duplex documents to file for the embodiment disclosed in FIG. 6. For instance, one overlay could be used for scanning to print a document, and a second overlay could be used for scanning to a file. A stack of overlays, each being used for a particular activity or range of activities, could be set beside a device. The tactilely readable label, like those discussed before, would identify the purpose for using the overlay.

Tactile overlays can also be used for non-touch sensitive screens having GUI displays thereon. Transparent overlays having tactile information thereon can be used with GUI displays so that visually impaired people can read the information on the screen. The user can, for example, use a standard keyboard to enter instructions or information into the device. For example, a visually impaired user may approach an electronic device, such as a computer, having a screen that has a base or initial display thereon. The user would use the corresponding overlay to read the first display. The user could then enter instructions and cause a new display to appear. If the displays always appear in the same order, the user may select the overlay that corresponds to the next display in sequence. Alternatively, an auditory signal may be used to inform the user which display is being displayed. The visually impaired user would put up the overlay corresponding to the audio signal received. A visually impaired user could read the new overlay and enter more instructions or information as required. If the person entering instructions or information is not adept at typing, he can use a keyboard overlay having tactile information such as Braille characters corresponding to keys on the keyboard.

Figure 11:
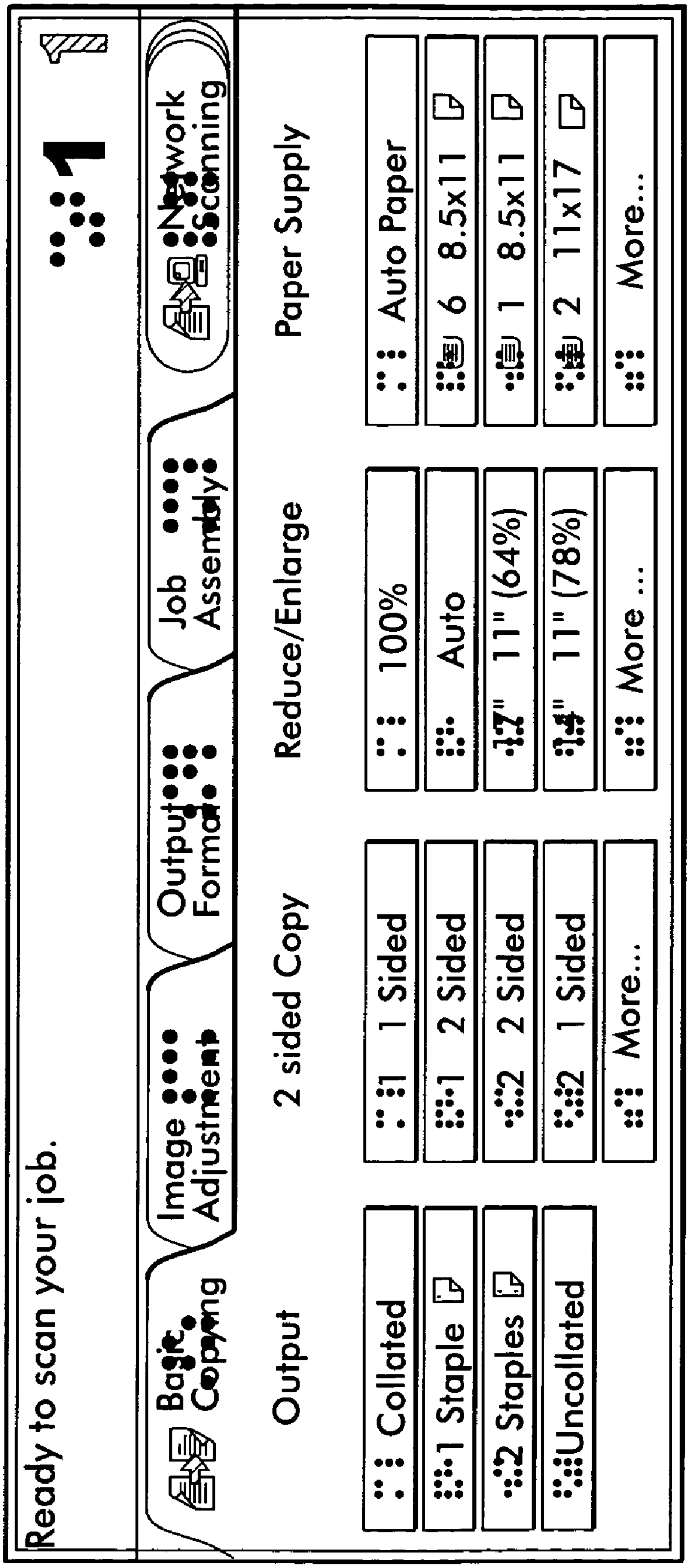
FIG. 11 illustrates a second exemplary embodiment of an overlay corresponding to the touch screen interface of FIG. 2.

In embodiments, the overlay is substantially transparent (for example, from about 90% to about 100% light transmissive) or at least light transmissive enough so that an operator with full visual acuity can see through the overlay without interference. A fully sighted user may thus assist the visually impaired operator in efficiently learning to use this system. In other embodiments, the overlay can be opaque. See FIG. 11. In these cases, the overlay would resemble the display on the screen over which it would be placed. This would still allow a sighted person to train a visually impaired person to use the overlay with a device.

The overlays can be made of a any of a variety of materials or substrates including, but not limited to, plastics, fibrous material such as paper, nonwoven fabrics, thin metal foils, thin layers of rubber materials such as neoprene.

Any number of methods may be used to hold the overlay to the screen. For example, the overlay can simply press fit to the screen. Many plastics are sufficient for press fitting. Embodiments have used 2 mil PVC or rubber. If a screen is sufficiently vertical, the overlay may still have difficulty staying in place. In cases where the overlay will not stay in place by press fit alone, other methods of securing the overlay in place may be used. These include, but are not limited to, clipping, use of a non-permanent adhesive, and taping. Tabs that extend beyond the edge of a screen may be used as well. Also, an adhesive material may be used to hold the overlay to a screen, such as, for example, the adhesive layer on the back of Post-It™ notes by 3M.

In embodiments, an overlay may cover the entire screen. In other embodiments, an overlay may only cover part of a screen or part of a display on the screen.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An overlay for use with a display screen, comprising at least one first tactilely readable area, wherein the display screen includes a first feature thereon, wherein the tactilely readable area includes information in a tactilely readable format, and wherein the information identifies a first feature displayed on the screen, wherein the overlay resembles the display on the screen over which it is placed.

2. The overlay of claim 1, wherein the tactilely readable area includes raised protrusions.

3. The overlay of claim 2, wherein the protrusions are Braille characters.

4. The overlay of claim 1, wherein the overlay further comprises at least one second tactilely readable area corresponding to a feature of a second graphical display on the screen.

5. The overlay of claim 1, wherein the screen is a touch-sensitive screen and the feature is selectable by touch.

6. The overlay of claim 1, further comprising means for holding the overlay in place over the screen.

7. A tactile method for using a device having a touch sensitive screen that has a first display thereon, comprising:

placing a first overlay on the screen, the first overlay corresponding to the first display on the screen and including a first tactilely readable area, the first tactilely readable area including information in a tactilely readable format, the information being specific to a first selectable feature located in the first display on the screen;

determining a location of and information about the first selectable feature on the screen by tactilely reading the first tactilely readable area on the overlay;

selecting the first selectable feature;

receiving a signal from the device;

removing the first overlay on the screen in response to the signal received;

placing a second overlay on the screen, the second overlay corresponding to a second display on the screen and including a second tactilely readable area, the second tactilely readable area including information in a tactilely readable format, the information being specific to a second selectable feature located in the second display on the screen;

determining a location of and information about the second selectable feature on the screen by tactilely reading the second tactilely readable area on the overlay; and selecting the second selectable feature.

8. The method of claim 7, wherein the first tactilely readable area includes raised protrusions.

9. The method of claim 8, wherein the protrusions include Braille characters.

10. The method of claim 7, wherein selecting the first selectable feature includes pressing the screen at the location of the desired feature.

11. The method of claim 7, wherein selecting the second selectable feature includes entering data through a keyboard.

12. The method of claim 7, wherein the signal is an audio signal.

13. The method of claim 12, wherein the audio signal is a voice instruction.

14. The method of claim 12, wherein the signal is a sequence of beeps, where the number of beeps correspond to the second overlay.

15. The method of claim 7, wherein the device is at least one of a scanner, a printer, and a copier.

16. A plurality of overlays for use with a screen upon which a plurality of displays may appear, wherein each of the plurality of overlays corresponds to one of the plurality of displays and resembles that display, and wherein each overlay has at least one tactilely readable area, wherein each tactilely readable area includes information specific to a feature of the display corresponding to the overlay, the information being in a tactilely readable format.

* * * * *